United States Patent [19]

Henry

[11] 4,362,435
[45] Dec. 7, 1982

[54] APPARATUS FOR LAYING PIPE

[76] Inventor: John T. Henry, 1226 Summit View Dr., Ft. Collins, Colo. 80524

[21] Appl. No.: 56,456

[22] Filed: Jul. 10, 1979

[51] Int. Cl.³ ............................................ F16L 1/02
[52] U.S. Cl. .................................. 405/154; 294/104; 405/179; 414/747
[58] Field of Search ............... 405/154, 174, 179, 303; 404/79, 111; 294/74, 103, 104; 414/745, 747

[56] References Cited

U.S. PATENT DOCUMENTS

| | | | |
|---|---|---|---|
| 1,057,227 | 3/1913 | Dubbs | 404/79 X |
| 2,290,565 | 7/1942 | Lagana | 294/74 |
| 2,654,630 | 10/1953 | Renfroe | 294/104 |
| 3,165,347 | 1/1965 | Keskitalo | 294/104 X |
| 3,191,787 | 6/1965 | Stearn | 294/74 X |
| 3,285,147 | 11/1966 | Gruvris | 404/111 X |
| 3,292,379 | 12/1966 | McElvany | 405/179 |
| 3,309,799 | 3/1967 | Kinkade | 405/174 X |
| 3,906,737 | 9/1975 | Brown | 405/179 |
| 4,166,544 | 9/1979 | Cecchi et al. | 405/154 X |
| 4,218,158 | 8/1980 | Tesson | 405/154 X |
| 4,266,819 | 5/1981 | Pemberton | 294/104 X |

*Primary Examiner*—David H. Corbin
*Attorney, Agent, or Firm*—Hugh H. Drake

[57] ABSTRACT

Apparatus lays pipe in a trench and joins successive sections thereof. An elongated carriage is of a length sufficient to straddle the trench and includes propelling means for engaging the surface outward from the respective upper sides of the trench and moving the carriage therealong. The propelling means is steerably driven. A crane arises from the carriage and includes an adjustably articulated arm of adjustable length and which has an outer end portion controllably movable both laterally with respect to the trench and between respective positions above and within the trench. The crane is mounted upon the carriage so as to permit tilting relative thereto and, thus, relative to the sidewalls of the trench. A controllable grapple is mounted on the outer end of the arm and is controlled to engage and disengage the pipe.

35 Claims, 22 Drawing Figures

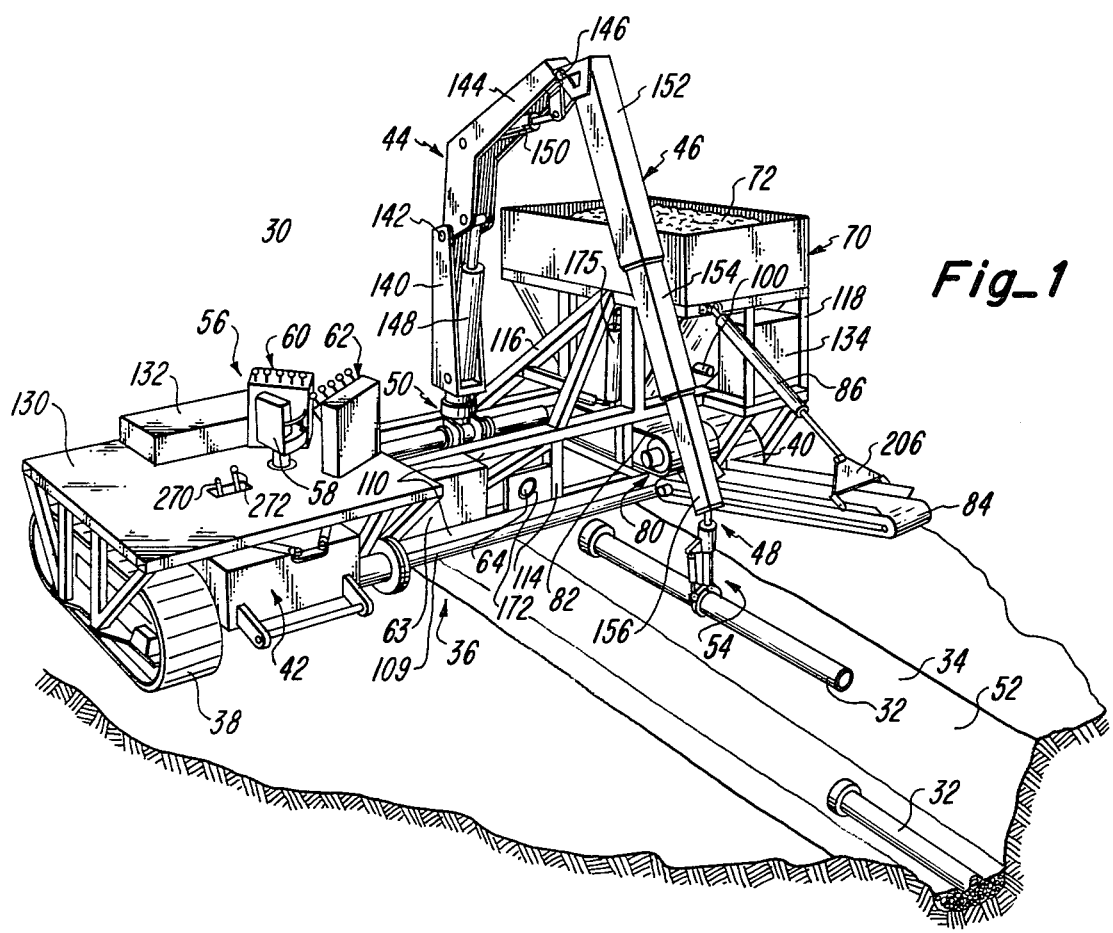
Fig_1
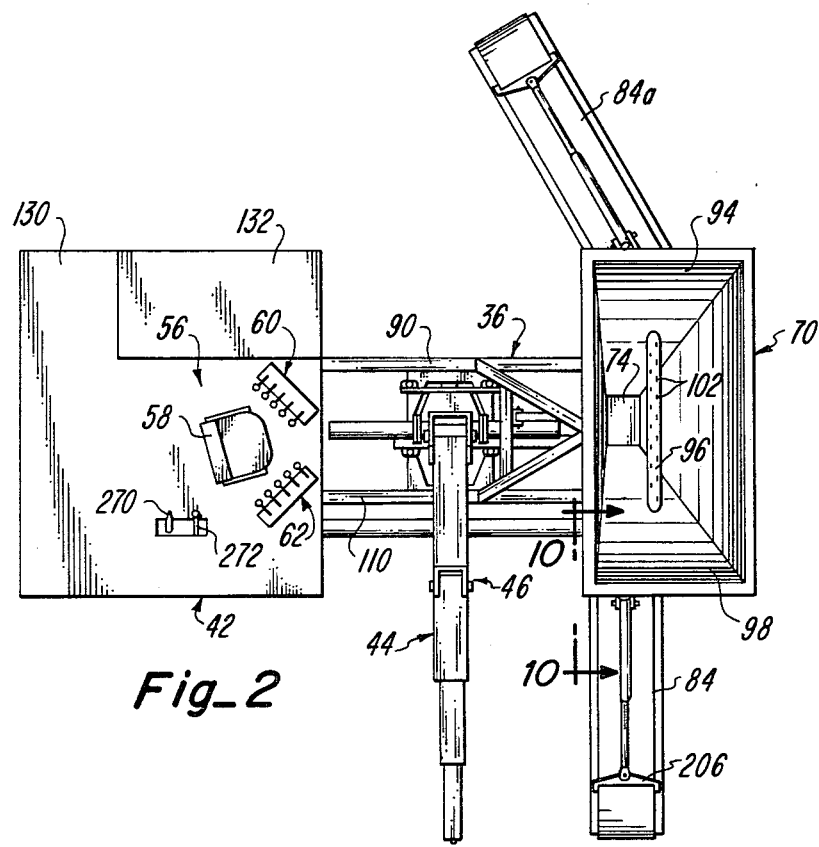
Fig_2

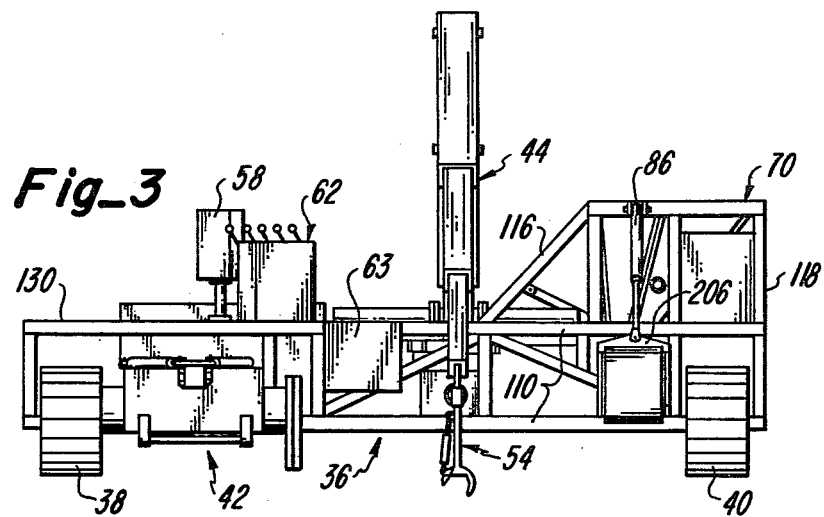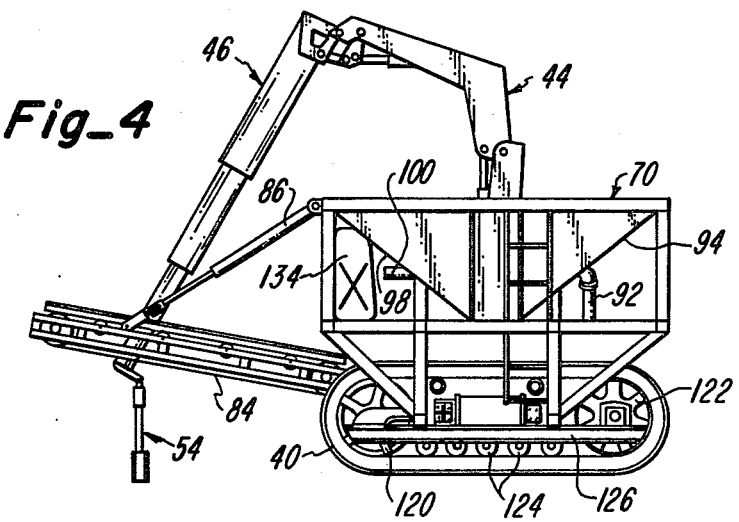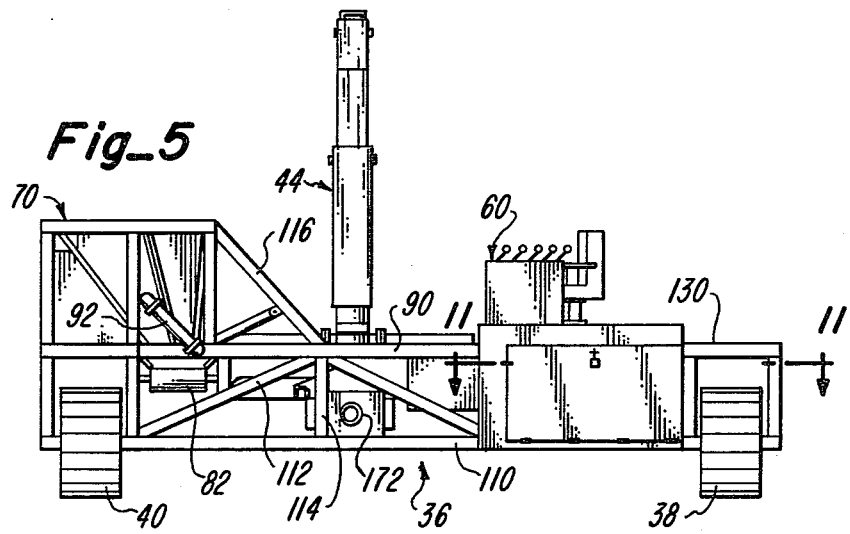

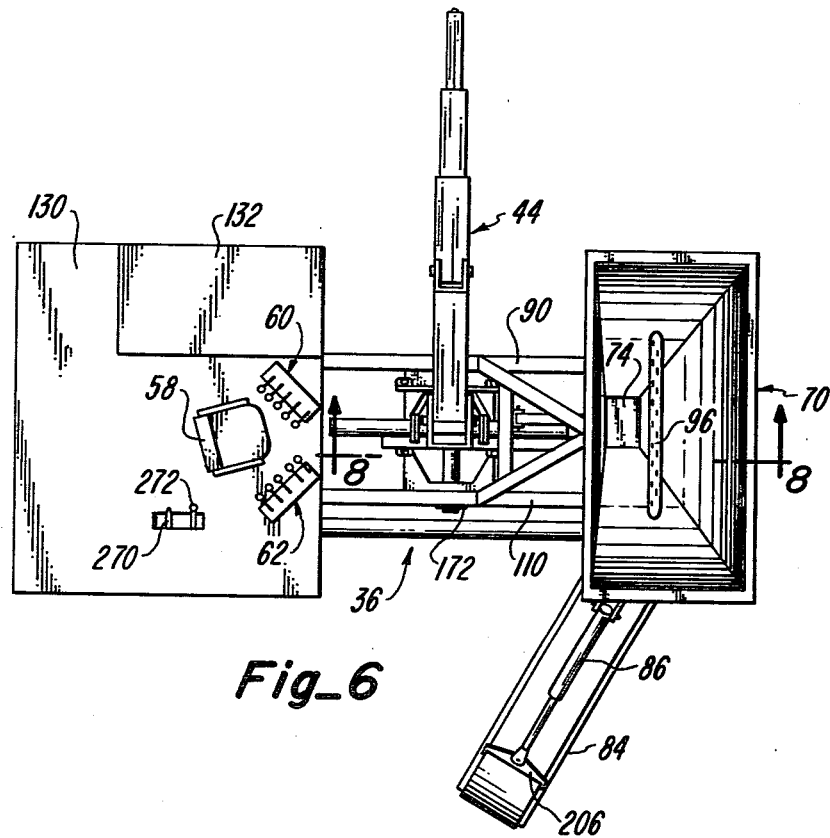
Fig_6
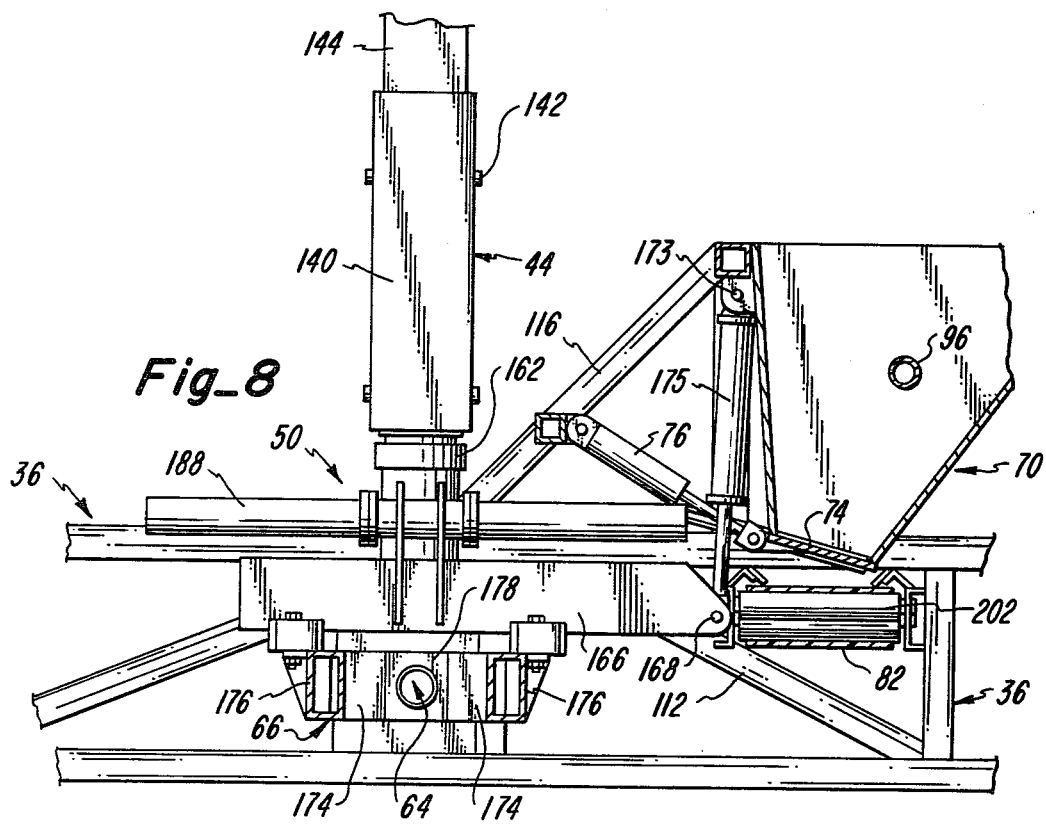
Fig_8

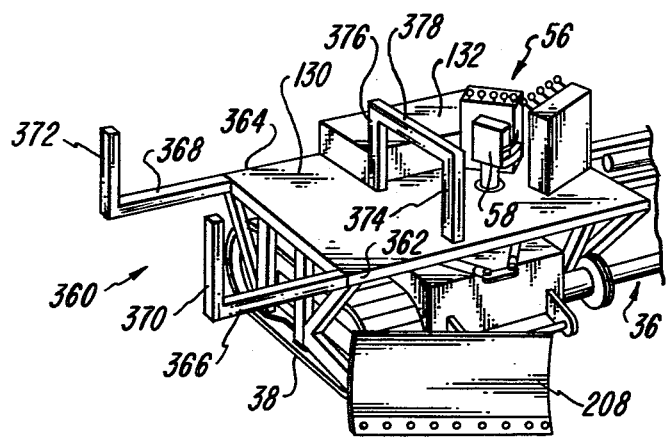
Fig_7

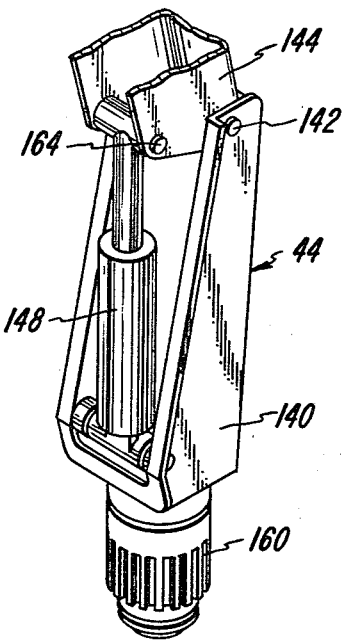
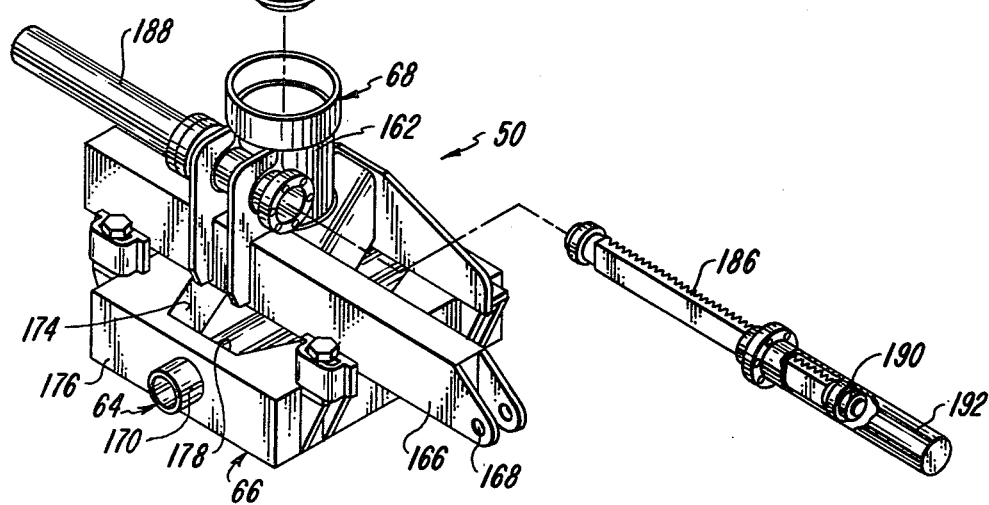
Fig_9
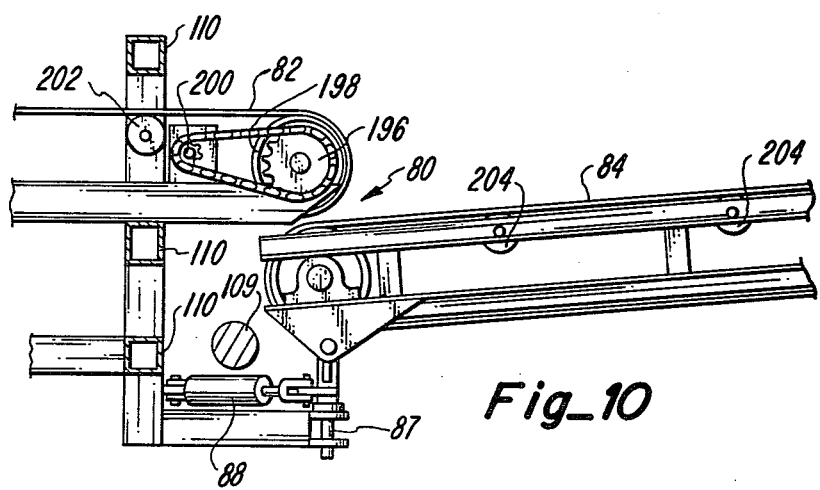
Fig_10

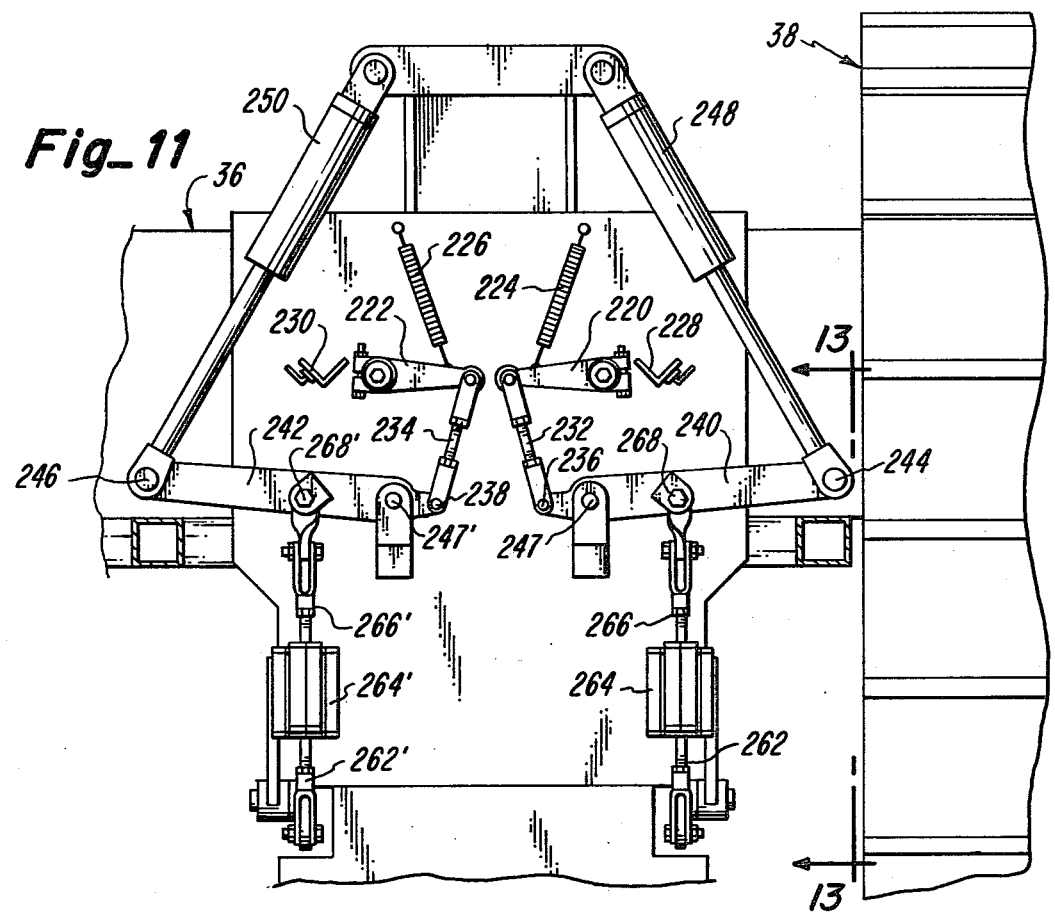
Fig_11
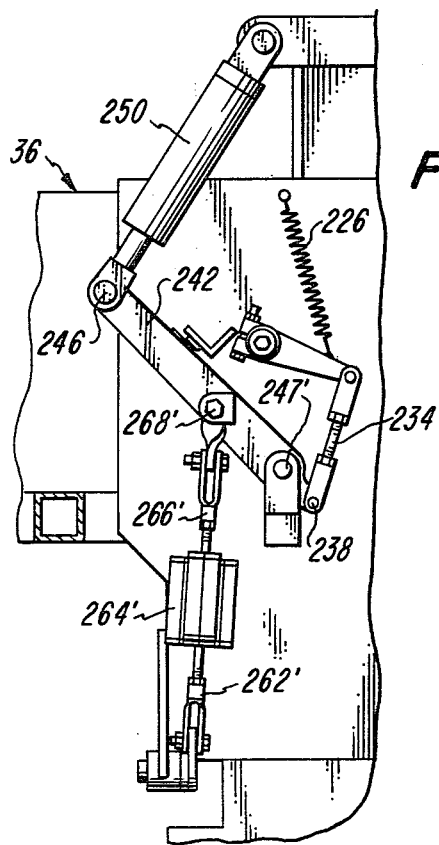
Fig_12
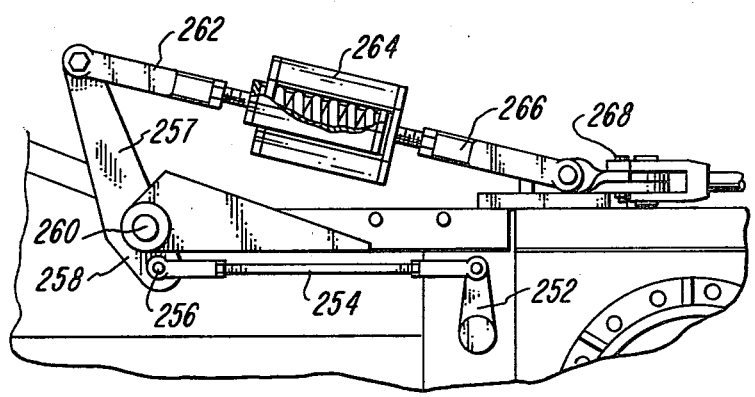
Fig_13

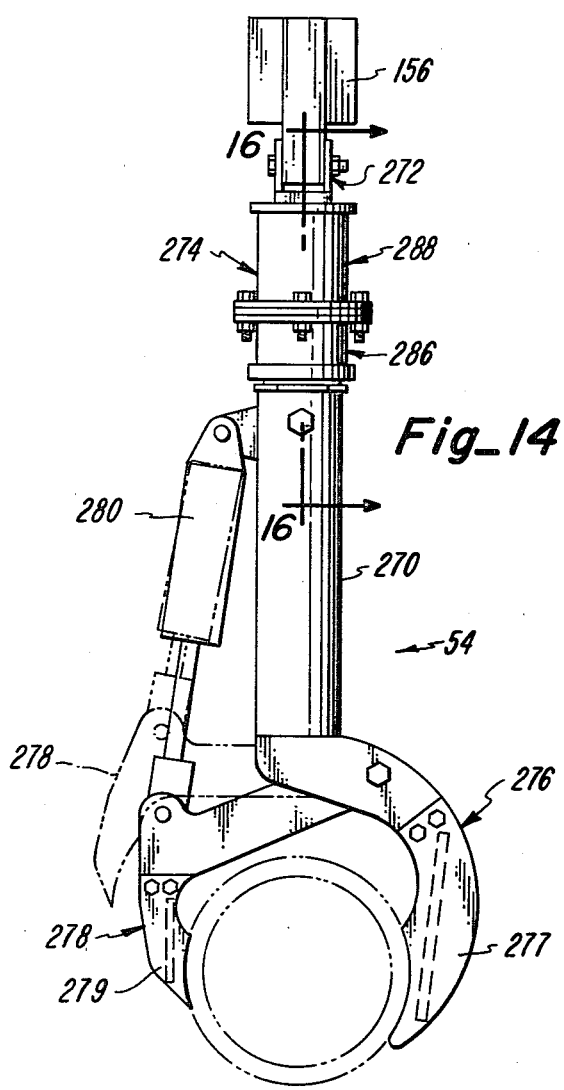
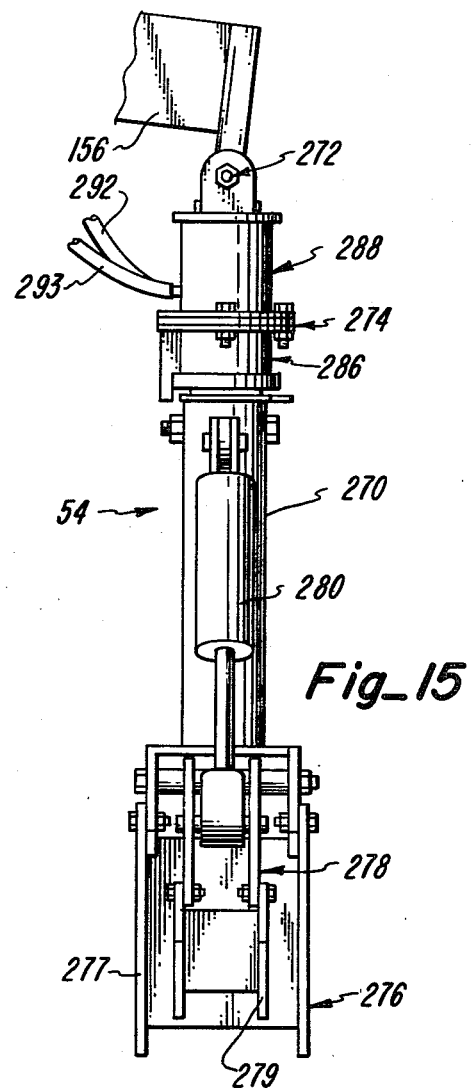
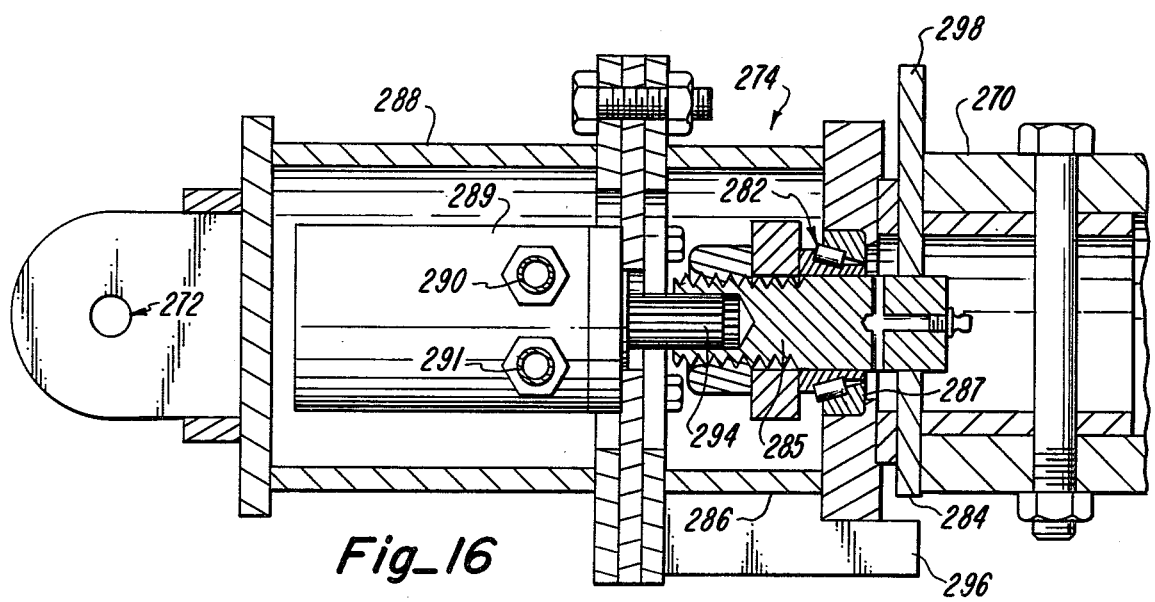

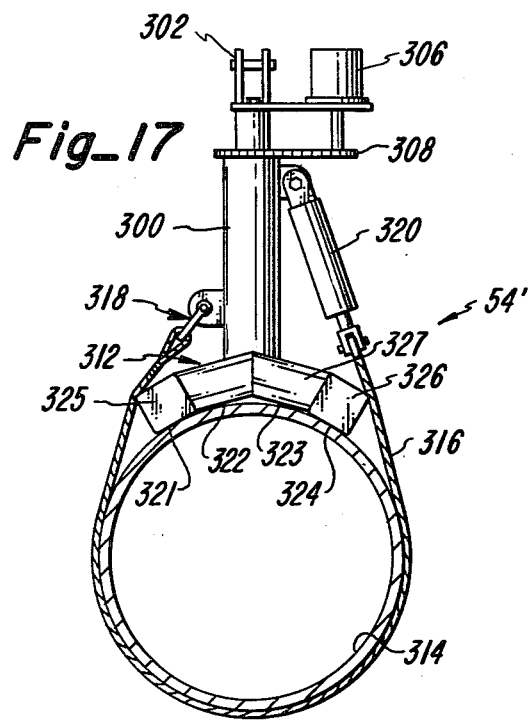
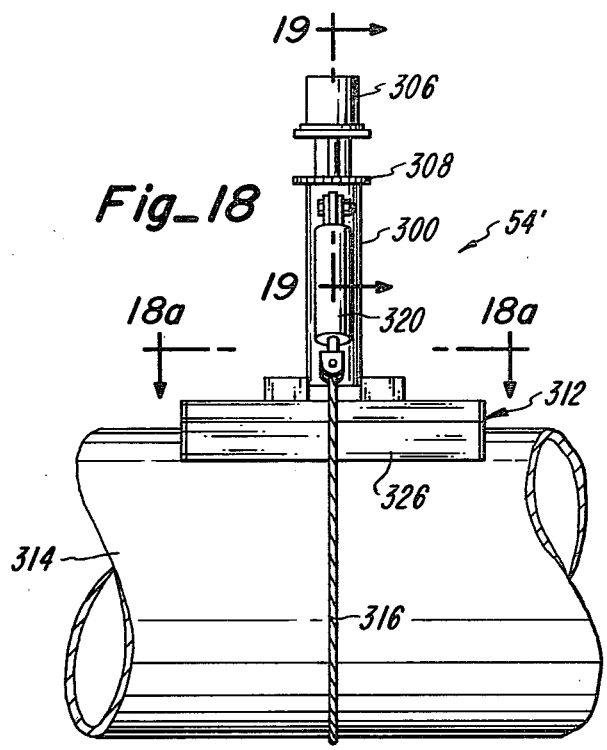
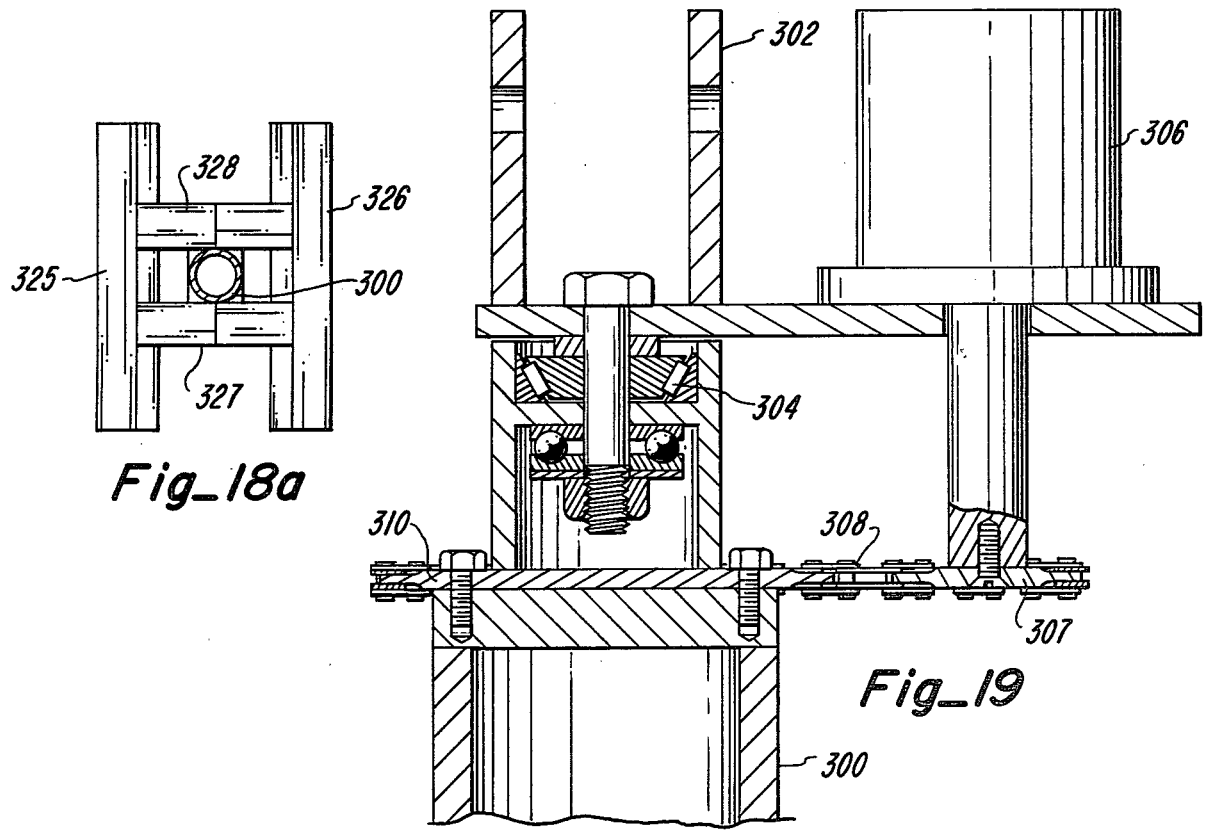

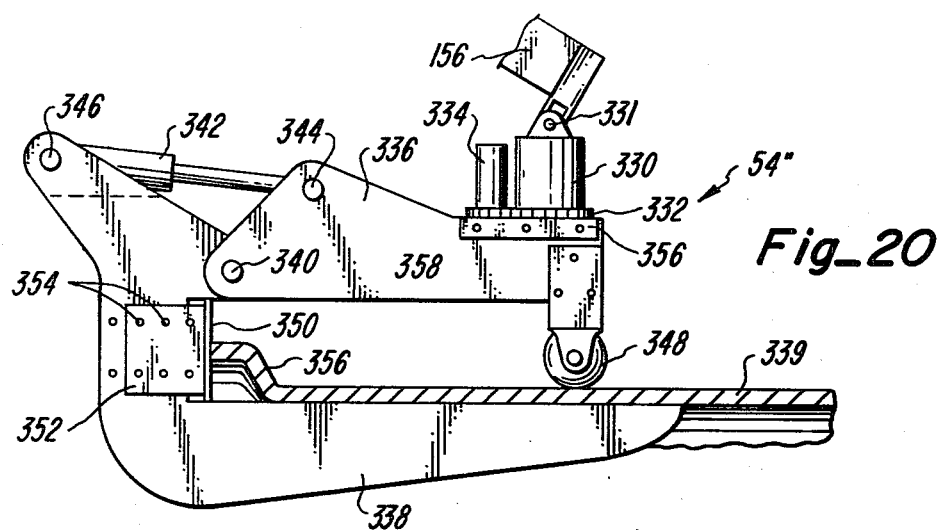
*Fig_20*
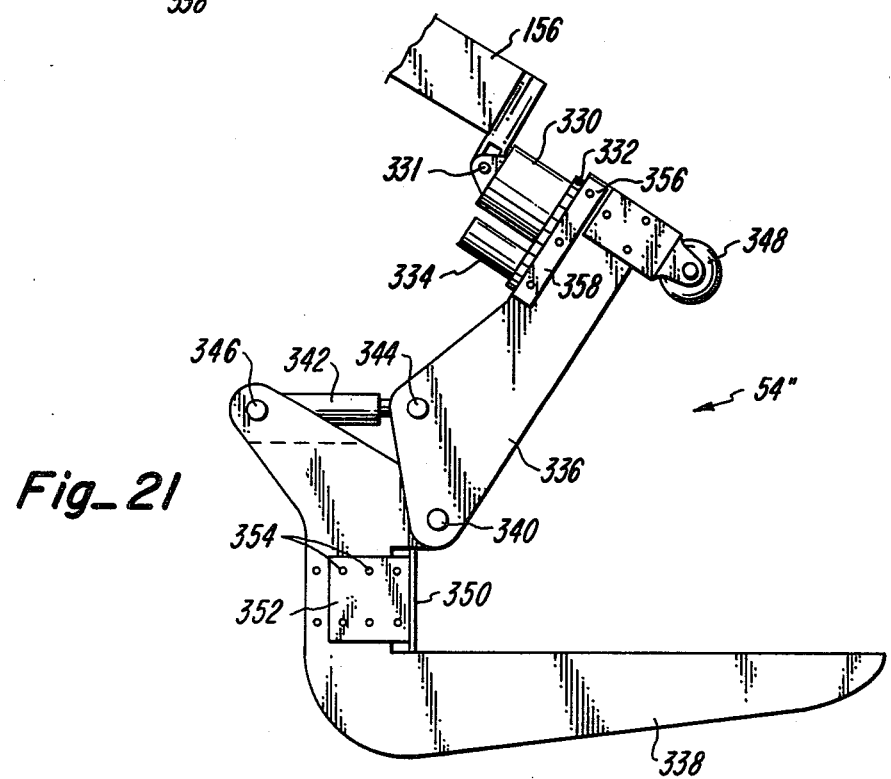
*Fig_21*
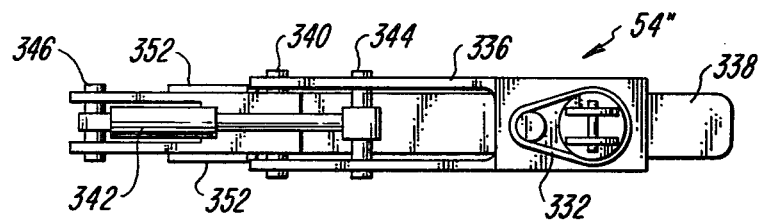
*Fig_22*

APPARATUS FOR LAYING PIPE

The present invention pertains to apparatus for laying pipe in a trench. More particularly, it relates to apparatus which combines a variety of different operations in achieving the overall results.

During the installation of piping designed to carry such fluids as water, sewage, gas or oil, it often is desired to bury the pipelines beneath the ground. Notwithstanding the prior development of a variety of equipment for assisting in that task, at least most present-day excavation contractors still lay pipe in deep trenches by first digging a trench with a backhoe or trencher, then covering the bottom of the trench with a somewhat flexible material such as course gravel, next using a crane (often in the form of the front lip of a bucket on a backhoe or the like) to pick up a piece of pipe attached to the latter manually and moving and ultimately lowering that pipe into the trench, thereafter using the efforts of personnel disposed within the bottom of the trench to join the pipe sections, subsequently employing apparatus such as a front-end loader or a backhoe to complete the butting of the laid pipe, and, finally, backfilling the trench to complete the covering of the laid pipe. This procedure normally involves the use of several different machines and a variety of different manpower.

It is a subject of intellectual curiosity that such a piecemeal approach to pipe laying still exists in view of a host of prior art suggestions which, had it been obvious to have combined them, long ago might have led one to devise a much better system. As far back as 1890, U.S. Pat. No. 436,914 taught the use of a carriage which straddled a ditch and was movable therealong by means of wheels which traversed the berms on either side of that ditch. As that carriage moved along, successive lengths of pipe were lowered by means of an elevator arrangement. In 1895, U.S. Pat. No. 536,339 was published to teach a rather overall combination which would make the trench, lay pipe and even move dug material from fore to aft so as to complete ultimate backfilling of the trench. Another straddle-type arrangement and associated apparatus is depicted in 1908 U.S. Pat. No. 892,538. Various other apparatus that might be at least adapted to pipe laying is known from a long list of prior art which includes U.S. Pat. Nos. 2,656,800, 2,830,548, 3,292,379, 3,381,478, 3,496,727, 3,541,799, 3,605,419, 3,744,259, 3,788,086, 3,820,345, 3,831,388, 3,849,998, 3,874,182, 3,903,624, 3,906,737, 3,969,904, 3,994,139 and 4,043,135. Similar attention to machine-assisted pipe laying has occurred in numerous foreign countries as represented by a mere sampling of foreign patents such as: German Pat. No. 2,058,336, Swiss Pat. No. 238,814, Swedish Pat. No. 214,999 and Dutch Pat. No. 6,618,007.

Pipe sections to be handled in the field of operation concerned may have diameters ranging from between about four inches and as much as forty-eight inches or greater. Usually being made of a material such as steel, cast iron, concrete or heavy plastic, each section may weigh up to several tons. It is not surprising, therefore, that, from a rather early date and continuing to the present, there has been an on-going interest in improving upon the type and degree of mechanization available for use in this field.

Yet, one need only to pass through areas in which sewer and drainage systems are being installed in residential and commercial subdivisions under development, or along major pipelines that are being installed perhaps between reservoirs and filter plants, to observe that the totality of all such prior art has not satisfied the needs of at least a substantial portion of the business. As indicated above, apparatus such as backhoes still are used not only for their ditch-digging function but also for picking up pipe from an adjacent surface and laying it somewhat blindly into a trench where personnel located within the trench complete the process of maneuvering the pipe sections and completing the couplings between successive sections. When performing that task, the backhoe or the like is not available for the digging job intended as its basic purpose. Otherwise, a separate crane must be supplied, and that has to sit to one side of the trench in a position from which its operator cannot see down into the trench. Moreover, other means must be provided for effecting the actual coupling of the pipe sections in the bottom of the trench. When using a trencher instead of a backhoe for digging the trench, the addition to the job of a crane or the like is a must. All such typical approaches still in use tend to waste a lot of the time of various ones of the personnel concerned and also may endanger personnel needed in the trench to guide the operator of the backhoe or crane in his placement of the pipe sections.

It is, therefore, a general object of the present invention to provide a new and improved pipe laying apparatus.

Another object of the present invention is to provide a new and improved pipe laying apparatus that minimizes the number of personnel required in connection with the overall pipe laying operation.

A further object of the present invention is to provide a new and improved pipe laying apparatus that leads to increased safety for the personnel associated with the operation.

A specific objective of the present invention is to provide a new and improved pipe laying apparatus that permits a single operator, in most cases, and from a position located outside the trench, to control both the placement of pipe sections within the trench and their coupling together in successive relationship.

A particular object of the present invention is to provide a new and improved pipe laying apparatus in which a single machine may achieve all of setting pipe sections to grade, aligning successive pipe sections, joining those sections and bedding the sections in place.

Detailed objectives of the present invention pertain to improvements in a variety of specific features of the overall apparatus, some of which features also are useful with other apparatus.

Still another objective is achieved by a new and improved basic form of such apparatus that lends itself to modification and the incorporation of additional components that afford still further degrees of flexibility and/or an even further degree in overall mechanization of the total operation.

The invention, thus, has to do with apparatus for laying pipe in the trench and joining successive sections of that pipe as laid. An elongated carriage is of a length sufficient to straddle the trench and has propelling means mounted under its end portions for engaging the ground surface outward from respective upper sides of the trench. The propelling means is driven steerably along the length of the trench. A crane arises from a central portion of the carriage and includes an adjustably articulated arm of adjustable length as well as having an outer end portion controllably movable both laterally with respect to the trench and between respective positions effectively above the upper level of the trench and within the trench below the level of the carriage. The crane is so mounted with respect to the carriage as to permit adjustable tilting of the crane relative to the side walls of the trench. On the outer end portion of the arm is a controllable grapple for engaging the pipe.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a fragmentary isometric view showing an apparatus constructed in accordance with the present invention and also depicting one mode of its operation;

FIG. 2 is a fragmentary and slightly-reduced top plan view of the apparatus shown in FIG. 1, certain components having been omitted but an alternative component, not shown in other views, having been added;

FIG. 3 is a front elevational view of the apparatus as shown in FIG. 2, again with certain components having been omitted;

FIG. 4 is a side elevational view of the apparatus shown in FIG. 3;

FIG. 5 is a rear elevational view of that same apparatus;

FIG. 6 is a view similar to FIG. 2 but showing certain components in different relative positions;

FIG. 7 is a fragmentary perspective view, patterned after FIG. 1 but showing optional additions to the apparatus;

FIG. 8 is a fragmentary and enlarged cross-sectional view taken along the line 8—8 in FIG. 6;

FIG. 9 is an exploded isometric view of a portion of the assembly shown in FIG. 8;

FIG. 10 is an enlarged fragmentary cross-sectional view taken along the line 10—10 in FIG. 2;

FIG. 11 is a fragmentary and enlarged plan view taken along the line 11'11 in FIG. 5;

FIG. 12 is a fragmentary view of a portion of that which is shown in FIG. 11 but with certain of the components in a different position;

FIG. 13 is a fragmentary side elevational view taken along the line 13—13 in FIG. 11;

FIG. 14 is an enlarged fragmentary view of a component shown in FIGS. 1 and 3, including a representation of a pipe section being held and also, by the use of dashed lines, depicting an alternate position for certain parts;

FIG. 15 is a side elevational view of the component shown in FIG. 14;

FIG. 16 is an enlarged fragmentary cross-sectional view taken along the line 16—16 in FIG. 14;

FIG. 17 is a fragmentary front elevational view of a component alternative to that which is shown in FIG. 14, also showing a section of a pipe portion;

FIG. 18 is a fragmentary side elevational view of the component shown in FIG. 17;

FIG. 18a is a fragmentary cross-sectional view taken along the line 18a—18a in FIG. 18;

FIG. 19 is an enlarged and fragmentary cross-sectional view taken along the lines 19—19 in FIG. 17;

FIG. 20 is a fragmentary side elevational view of a still further alternative for the components shown in FIGS. 14 and 17 and differently embracing a pipe section;

FIG. 21 is a view similar to FIG. 20 but showing certain of the components in different positions and without the pipe section; and FIG. 22 is a top plan view of the components shown in FIG. 20 with one element and the pipe section removed.

Shown in FIG. 1 is one form of apparatus that has been built and determined to operate successfully in an experimental trial. Apparatus 30 lays pipe sections 32 in a trench 34 and joins successive ones of sections 32. In addition, apparatus 30 aligns the sections, sets them to grade and beds them in place. An elongated carriage 36 is of a length sufficient to straddle trench 34. At each end portion of carriage 36 are propelling means, including tracks 38 and 40, that engage the surface of the ground on the berm out from respective upper sides of trench 34 and serve to move carriage 36 along the trench. Included within apparatus 30, in this case generally adjacent to track 38 at 42, is an engine and control system which serves to drive tracks 38 and 40 steerably along the length of trench 34. A crane 44 rises upwardly from the central portion of carriage 36 and includes an adjustably articulated arm 46 of adjustable length and which has an outer end portion 48 controllably movable both laterally with respect to trench 34 and between respective positions effectively above the upper level of trench 34 and within the trench below the level of carriage 36. Crane 44 is secured by mounting means 50 with respect to carriage 36 so as to permit adjustable tilting of crane 44 relative to the sidewalls 52 of trench 34. A controllable grapple 54 is mounted at outer end portion 48 of arm 46 and is engageable with a pipe section 32.

Mounted on carriage 36 is a control station 56 located in a position that enables an operator, seated upon a chair 58 and using control panels 60 and 62, to govern and observe movement of grapple 54 and, ultimately at the bottom of trench 34, joinder of successive sections 32.

In this case, a successful initial embodiment of apparatus 30 was constructed from a commercial bulldozer. The assembly which included track 40 was severed from the original unit and spaced outwardly therefrom by means of carriage 36. The drive train components of the bulldozer were retained for supplying motive power to the tracks. A diesel engine in this case drives three hydraulic pumps which, in turn, supply fluid to a variety of hydraulic motors to provide operational power for a number of controllably movable components yet to be described in more detail. The hydraulic system includes the usual reservoir 63 in which hydraulic fluid is stored.

The hydraulic fluid distribution is strictly conventional in approach and includes the usual system of piping, actuators and valves all under control of operating handles on panels 60 and 62. Ultimately, a variety of different hydraulically operated motors and rams, many of which will be further described, are caused to be operated through the control levers on panels 60 and 62 for various purposes within the apparatus. Thus, conventional hydraulic controls and feed systems are employed to enable the operator at control station 56 to adjust steering by means of control of tracks 38 and 40, to adjust articulation of arm 46 as well as the ultimate length of that arm, to adjust movement of the outer end of arm 46 both laterally and relative to the levels of trench 34 and carriage 36 and also to adjust lateral tilting of crane 44.

As shown in more detail in FIGS. 8 and 9, mount 50 includes a pivot bearing at 64 secured to the central portion of carriage 36 and having a mounting block 66 secured to carriage 36 and a coupling 68 that supports crane 44, all to permit the aforementioned tilting of the crane. Coupling 68 also permits swinging of crane 44 in a direction laterally of the trench.

The berms upon which tracks 38 and 40 ride are seldom at the same level. For safe, efficient and satisfactory operation, however, it is necessary that crane 44 be mounted so as to be able to assume a vertical orientation regardless of the level of carriage 36. Rather than attempt to level the entire machine, block 66 constitutes an adjustable platform. As yet to be described in more detail, block 66 is controllably adjustable in level about pivot 64 relative to carriage 36 and, thus, to the trench itself. On the other hand, crane 44 is the only element of the entire machine that is critical of orientation relative to the vertical.

As herein specifically embodied, all components of crane 44 shown in FIGS. 8 and 9 and disposed above block 66 are commercially available as a standard assembly normally intended for mounting on a truck bed. In fact, a single-ended pivot member in the base of that assembly for a different purpose could be made double-ended to serve as pivot 64 and eliminate the need for block 66 as a separate component.

Also mounted upon carriage 36, and in this case at the end thereof which includes track 40, is a hopper 70 for carrying a pipe bedding material 72, such as crushed stone or other fill, that is to be deposited into the trench. A shutter or gate 74, open and closed by means of a ram 76 (FIG. 8), is disposed at the bottom of hopper 70 in order adjustably to control dispensing of material 72 from the hopper.

For delivering material 72 from hopper 70 into trench 34, a conveyor system 80 is included. System 80 includes a first belt-type conveyor 82 (FIG. 10) that receives gravel or the like from the bottom of hopper 70 and may deliver it forwardly onto a second conveyor 84 also of the belt type and likewise hydraulically driven for movement. The outer end of conveyor 84 is swing mounted from a ram 86 adjustable in length to control the relative level of the delivery end of the conveyed material. The inner end of the conveyor 84 is pivotally mounted from carriage 36 at 87. A ram 88, coupled between carriage 36 and the pivot mounting for conveyor 84, enables the latter to be swung between a position displaced to one side of trench 34 as shown in FIG. 1 and a position in which its outer end is disposed over the trench as shown in FIG. 6.

As shown only in FIG. 2, the symmetry of the machine enables the optional addition of a rearwardly extending conveyor 84a which is, with respect to hopper 70 and conveyor 82, a mirror image of conveyor 84. That is, it is mounted and moved in the same way with respect to conveyor 82 and hopper 70. Conveyor 84a may be used to deliver bedding material into the trench from the rear of apparatus 30. To that end, conveyor 82 is reversible in direction of transport of material from hopper 70.

All conveyors are driven by hydraulic motors adjustable as to speed by control valves on panels 60 and 62. Control of the rate of delivery of material received from the hopper and delivered by way of the conveyors into the trench is also governed, of course, by the amount of opening of gate 74 in the hopper, which also is controllable from panels 60 and 62.

As already indicated, the overall motive and driving power is derived from an engine which, in the particular case illustrated, is a diesel-fueled internal-combustion variety that, of course, exhausts hot outlet gases. Preferably, this heated exhaust fluid or gas is conveyed through tubing which runs through carriage 36 to hopper 70. That tubing which conveys those gases along the extent of the carriage is a hollow tube 90 (FIG. 5) which also serves as a girder of the carriage. A coupling pipe 92 is connected between tube 90 and a rear wall 94 of hopper 70 in a manner to lead the exhaust gases through a vent tube 96 that extends somewhat centrally through the lower portion of hopper 70 and on outwardly from a forward wall 98 to an ultimate exhaust outlet 100.

Vent pipe 96 includes a plurality of comparatively small-sized outlet openings 102 that serve in use to permit the hot exhaust gases to escape into material 72 and melt any icing that has formed in cold weather. To this end, outlet 100 is restricted in size by an amount sufficient to force a portion of the exhaust gases out of openings 102. Moreover, the exhaust gases from the engine include a significant proportion of steam. The emission of that steam tends to condense on and humidify the aggregate, when that is the type of material within hopper 70. This serves to dampen the amount of dust in the aggregate as ultimately delivered by a conveyor into the bottom of the trench, where it otherwise might form a cloud that would obscure the vision of the operator seated upon chair 58.

Directing attention now to some of the more detailed aspects of the structure, it will be observed that carriage 36 carries a laterally extending drive shaft 109 and in itself is composed of a series of laterally oriented girders formed of horizontal members as at 110 and, as already mentioned, even including tube 90. Where necessary for structural strength, braces as at 112, struts as at 114, and other strength-giving elements are included in the girder assembly in the normal manner of manufacturing such truss structures. Analogously, hopper 70 is supported by various braces and struts as at 116 and 118. Of course, the inter-supporting arrangement of such truss members is subject to different specific design as may be desired in a particular implementation.

Tracks 38 and 40, as indicated for track 40 in FIG. 4, are mounted on the usual wheels 120 and 122 and supported for movement with respect to various idler rollers 124. The axles of wheels 120 and 122, as well as of the rollers, are supported from a framework 126 at the respective ends of carriage 36. It is to be noted, however, that at least a light-weight version of the machine, useful for the laying of pipes in smaller sizes, could be mounted upon inflatable tires. It would be capable of laying (and joining) all underground pipe needed for a sub-division, for example. Again, only a single operator would be required to accomplish all of the tasks previously mentioned.

Station 56 includes a platform 130 mounted on top of driving unit 42 and on which chair 58 and panels 60 and 62 are mounted. As illustrated, the platform is supported by means of suitable braces and struts extending from carriage 36 and from the framework that supports track 38. At the rear of platform 130 is, in this case, a portion of a housing 132 for the upper portion of the engine. A fuel tank 134 is situated within the framework that supports hopper 70, that location being selected because of convenience in the particular embodiment; of course, that tank could be located elsewhere if desired.

Although the various different movements could be electromechanically controlled by other suitable known apparatus, it has already been indicated that such movement control in the embodiment illustrated is by means of hydraulics. This means that a variety of different hydraulic lines lead to and from control panels 60 and 62 to different parts of the apparatus and particularly to the various rams some of which have already been mentioned and others which will be identified hereinafter. For clarity, the various different hydraulic lines have not been shown in the drawings, although it would be understood that they would generally be distributed along and through the different girders, braces and struts. Again, the implementation of such a hydraulic control system is strictly routine.

Except for its mount at 50 and the grapple which may be employed at 54, crane 44 in itself is of known construction as already indicated. In fact, in connection with the fabrication of the embodiment specifically shown in FIG. 1, crane 44 was a purchased part. It includes an upright stanchion 140 pivotally coupled at 142 to a forwardly bent section 144 which in turn is pivotally coupled at 146 to arm 46. A ram 148 pivotally coupled at its opposing ends between stanchion 140 and section 144 controls articulation as between those two members, while a ram 150 similarly is pivotally coupled between section 144 and arm 46 and controls the degree of articulation between that set of members. In addition, arm 46 is in this case composed of three different telescopic segments 152, 154 and 156, each slidable within the next and each including an enclosed ram adjustable to control the amount of projection of one from the next.

As best seen in FIG. 9, a pinion 160 depends downwardly from stanchion 140 and is received within a bearing 162 affixed to block 66. Ram 148 is effectively pivoted between pinion 160 and a pivot point 164 located on section 144 spaced from pivot 142 so as to achieve the previously described articulation. Rigidly secured to block 66 is a cross bar 166 pivoted at one end 168 to one end of a ram 175 (FIG. 8) rigidly secured at its other end as at 173 with respect to carriage 36 as, in this case, being secured to a cross strut at the upper end of hopper 70. Pivot pin 64 is composed of a cylindrical shaft 170 projecting outwardly from opposing sides of block 66 and into relationship with corresponding bearings 172 rigidly secured to carriage 36 at corresponding locations. Bearings 172 are each composed of a block that defines a sleeve bearing supported by webs 174 otherwise rigidly secured between cross struts 176 of carriage 36. Of course, webs 174 and the central portions 178 associated with bearings 172 are of rugged construction in view of the necessity of providing full support for crane 44.

Pinion 160 mates within bearing 162 to a rack 186 slidably mounted within a sleeve 188 secured on top of block 66. Rack 186 is symmetrically formed, with only one end, having a piston 190 disposed within a cylinder 192, being shown in detail. When in operation, reciprocation of rack 186 serves, of course and through pinion 160, to swing crane 44 back and forth in a direction laterally of trench 34.

Conveyor units 82, 84 and 84a are, in themselves, quite conventional. As shown in FIG. 10, conveyor 82 includes a conventional drive roller 196 coupled by a chain 198 to a hydraulic motor 200. Each conveyor includes such a motor drive and suitable idler rollers 202 and 204. For vertical movement of conveyors 84 and 84a, the outer end of the ram of a cylinder 86 is connected to a bridle 206.

Before proceeding further, it may be noted that, as shown in FIG. 7, the apparatus may include an out rigged dozer blade adjustably located by hydraulics ahead and/or behind of each of tracks 38 and 40. During operation, blade 208 may be utilized to smooth or obtain a better level of the berm provided on each side of trench 34. Blades 208 may also be used as outriggers to stabilize apparatus 30 when, in view of the terrain, crane 44 has to reach out beyond a normal amount for an excessive weight. To better perform only that function, blades 208 may be pads that engage the surface of the surrounding ground.

Disposed beneath platform 130 is a preferred clutch and brake operating arrangement for the machine adapted. Like in most bulldozers, and particularly here for the purpose of providing accurate steering so as to assist avoiding inadvertent operation that might otherwise allow one of tracks 38 and 40 to fall into trench 34, a so-called skid steer drive system is used. Either of tracks 38 or 40 at any time may be drivingly engaged, while either track may be operatively braked. As herein preferably employed, the skid-steering mechanism uses a combined and interrelated clutching and braking control of each of tracks 38 and 40. At, perhaps, greater cost, known proportional-type fully-hydraulic drives for driving each track may be substituted.

With particular reference to FIGS. 11-13, the left side of the assemblage as shown in FIG. 11 serves to control operation with respect to track 40, while the right side of the symmetrical arrangement is devoted to control of track 38. Included within motor power unit 42 is a transmission assembly that provides two separate torque outputs, one for each of tracks 38 and 40 and with each of those outputs including a clutch in a normal manner. Operating one of those clutches is a lever 220. Similarly associated with the other clutch is a lever 222. Each of those clutches is biased to a normally engaged position by respective springs 224 and 226. Appropriately located corresponding stops 228 and 230 contain operators which, when contacted by opposing surfaces on levers 240 and 242, actuate appropriate switches electrically connected into one of panels 60 and 62, so as to provide the operator seated in chair 58 an indication of the status of clutching and braking operation. The outer ends of levers 220 and 222 are coupled by adjustable links 232 and 234, respectively, to operating ends 236 and 238 of respective cranks 240 and 242 that have corresponding driven ends 244 and 246. Driven ends 244 and 246 are pivotally connected, remote from swing pivots of the respective levers at 247 and 247', to one end of corresponding rams 248 and 250 effectively pivotally mounted at their other ends to frame 36. Rams 248 and 250 are controlled from panels 60 and 62.

Each assembly that mounts one of tracks 38 and 40 is provided with a mechanically operated brake, although it may, in the alternative, be hydraulically operated. In any case, each brake is operated by a control lever as illustrated at 252 for the brake associated with track 38. The swinging end of lever 252 is coupled through adjustable-length link 254 to one end 256 of a crank 257 effectively pivoted at 258 on carriage 36. The other end of crank 257 is pivotally coupled to a series combination of a bar 262, a tension-spring unit 264 and another bar 266 the remote end of which is pivotally coupled at 268 to an intermediate portion of crank 240.

FIG. 13 is particularly directed to the linkage as coupled with respect to track 38, while FIG. 12 is directed to the side of the overall assembly that controls track 40 on the other side of carriage 36. Thus, some of the numbers particularly mentioned with regard to FIG. 13, and which refer to identical components on the other side, are denoted in FIG. 12 with primes.

Referring back to some of the earlier figures, a pair of control levers 270 and 272 project upwardly from platform 130 in a position to be operated by the foot of the operator seated in chair 58. Those levers, as shown, only control normal gear-shifting and transfer between high and low ranges of the same. With a preferred complete hydraulic control of brake and clutch action, as is known, levers 270 and 272 may be omitted. As embodied, levers 270 and 272 have seldom been used, although they have provided an additional degree of flexibility.

The different dimensions as assigned to the various linkages, in connection with the biasing force established by springs 264 and 264', are such that operation of either one of rams 248 and 250, at perhaps two-thirds of potential movement, causes clutch operation. Further ram extension also applies the associated brake. This sequential operation, first of the clutch and then of the brake, allows the operator to have a maximum degree of flexibility in his control of operation of the skid-steer mechanism while yet requiring that he manipulate only a total of two controls or other operators, one for each side. Such a marriage of the clutch and brake systems in the enablement of hydraulic control of the same permits not only a desired degree of flexibility of control but also avoids the need for any kind of differential transmission in the power train between the driving source and the propelling means at either side of the unit.

It will be observed that FIG. 11 illustrates a condition of "go"—full applied power to both of tracks 38 and 40. On the other hand, FIG. 12 depicts the condition for full braking of left-most track 40. As mentioned, however, there is a straight through delivery of power to both of tracks 38 and 40. Even if one track has lost traction, in such as sand or mud, the other is still fully powered. As a result, apparatus 30 is constrained to travel along a guided line, regardless of ground conditions.

FIGS. 14–16 illustrate details of grapple 54 as generally shown in FIG. 1. In this case, grapple 54 is composed primarily of a vertical shaft 270 pivotally coupled at its upper end portion to the outer end portion of arm section 156 as indicated at 272. A bearing assembly 274, disposed between pivot 272 and shaft 270, permits rotation of shaft 270 about its longitudinal axis. Pivot 272 also serves to permit suspension of shaft 270 in a vertical direction.

On the lower end of shaft 270 is a rigidly affixed pipe-clamping jaw 276. A second jaw 278 is movable toward jaw 276 in mutual relationship so as to clamp a pipe section 32; to that end, jaw 278 is pivotally coupled with respect to the upper end of jaw 276. A ram 280 is pivotally coupled between an intermediate portion of jaw 278 and the upper end portion of shaft 270. As illustrated, jaws 276 and 278 each may be conformed on their inner surface so as to accept a particular diameter of pipe 32. Moreover, jaws 276 and 278 preferably have respective removable outer fingers 277 and 279 bolted securely in place as shown. This permits the substitution of differently conformed jaw forces to accommodate other pipe diameters. As also illustrated in phantom in FIG. 14, jaw 278 is enabled to be swung outwardly by ram 280, so that a section of pipe 32 may be received and thereafter clamped by movement of jaw 278 into such relationship.

Assembly 274 includes a thrust bearing 282 that permits longitudinally rotatable suspension of shaft 270 from arm 46 by way of outer section 156. That thrust bearing assembly includes a plate 284 secured between the upper end of shaft 270 and a bearing element assembly 285. A collar assembly 286 rigidly suspends a bearing race assembly 287 from a housing 288 attached to pivot 272. Located within housing 288 is a hydraulic motor 289 having fluid ports 290 and 291 coupled to hoses 292 and 293. The motor output shaft 294 is spline-coupled to bearing element assembly 285. Thus, motor 289 is a driver for rotating shaft 270, and grapple 54, about a generally vertical axis. In this case, an ear 296 depends downwardly from assembly 286 in the path of movement of a lug 298 that projects laterally from one side of plate 284. Ear 296 and lug 298 limit rotation of shaft 270 to slightly less than three-hundred-sixty degrees.

Directing attention next to FIGS. 17–19, a different grapple 54' is shown. This form of grapple again includes a vertical shaft 300 having a pivotal connection 302 at its upper end portion for coupling to the outer end section 156 of arm 46. Shaft 300 is so mounted, as specifically shown with regard to the thrust bearing 304 exhibited in FIG. 19, as to be rotatable about a vertical axis. A hydraulic motor 306, through a sprocket 307 and a chain 308 that drives a sprocket 310 on the upper end of shaft 300, serves to rotate the latter about its normally vertical axis. Alternatively, the motor drive system of the grapple in FIGS. 14–16 could be substituted. Another alternative that would be highly suitable is to use a planetary gear system to couple a hydraulic motor to shaft 300.

A pipe-engaging abutment 312 is rigidly affixed on the lower end of shaft 300 and is engageable with a section of pipe 314. Abutment 312 presents a downwardly facing surface of generally concave configuration. A flexible sling 316 is of a length to encircle pipe 314. Sling 316 is secured at one end 318 to a side of shaft 300, and, on the opposite side of the latter, the other end of sling 316 is flexibly secured to shaft 300 by means of a ram 320.

Abutment 312 is specifically formed to have a lower face which presents a succession of facets 321, 322, 323 and 324 mutually disposed to define successive chords of a circle. As best seen in FIG. 18a, facets 321 and 324 in this case are the undersides of respective longitudinal bars 325 and 326 spaced rigidly apart by struts 327 and 328. Struts 327 and 328 are rigidly secured to opposite sides of shaft 300 and both are formed to bend downwardly from their mid-portion, so that their undersides define facets 322 and 323.

With this arrangement, grapple 54' is capable of handling a wide variety of pipe sizes without the need to change any part. A pipe smaller than that shown is nestled against only inner facets 222 and 223. On the other hand, a pipe larger than that shown would be held by engagement against the outer end portions of facets 321 and 324. When desirable by reason of the characteristics of the pipe material, abutment 312 may be padded. Similarly, sling 316 may be formed from any flexible material including, for example, wire cable, nylon rope, nylon or other webbing or a chain. The sling may also be padded.

A still different form of grapple 54" is shown in FIGS. 20-22. This version is particularly adapted to pick up and balance types of pipe, such as concrete, that are more likely to fracture if they should be too tightly compressed by a grapple. Again included is a vertical shaft 330 pivotally coupled at 331 to the outer end of section 156. As in the version of FIG. 17, a chain drive 332 in this case is coupled to a hydraulic motor 334 and serves to rotate shaft 330 about a vertical axis as the assemblage is suspended. As before, other rotary drives may be substituted.

Affixed at the lower end of shaft 330 is a bifurcated finger 336 that projects laterally outward as shown. A jaw 338 is pivotally coupled to the outer end of finger 336 and is swingable to a location spaced beneath finger 336 so as to be able to support the upper inner surface of a section of pipe 339 between itself and the finger. That swinging movement of jaw 330 relative to finger 336 is achieved by use of a pivot 340. A ram 342 is pivotally coupled at its respective opposite ends 344 and 346 between finger 336 and jaw 338 so as to swing the latter relative to the former. Projecting downwardly from the end of finger 336 generally disposed beneath shaft 330 is a roller 348 in the form of a pneumatic tire.

Grapple 54" is basically what is known in the trade as a "hairpin". Jaw 338 has a length of at least one-half the length of pipe section 339 and a cross-sectional size sufficiently small to enable insertion of the jaw within one end of the pipe section. In the usual "hairpin", finger 336 is rigidly affixed with respect to jaw 338, the only pivot being as at 331. The geometry is such that, with the pipe loaded on the jaw, the jaw hangs in a substantially horizontal position. Without the pipe, however, the jaw (and the combined finger) tilts down toward the closed end. Thus, a workman often is used to manually level the jaw as it is being inserted into a pipe section. An alternative could be to affix a cable between the closed end of the "hairpin" and a reversible winch mounted on the suspending crane; that, however, would interfere with rotation of the grapple about a vertical axis.

The inclusion of ram 342 and pivot 340 permits the orientation of jaw 338 to be leveled to the degree desired whether loaded or unloaded with a pipe section and regardless of variation in the angulation of outer section 156 of crane 44 relative to the horizontal. As illustrated in FIG. 20, wherein pipe section 339 is being supported in balance, ram 342 is extended. Without the load of the pipe section, as in FIG. 21, ram 242 is contracted to maintain level of jaw 338 for the same angulation of section 156. On any change in the angulation of the latter, ram 242 may be changed in length to keep jaw 338 at level. That is, control of the degree of jaw opening affords adjustment of the level of jaw 338 in both the loaded and unloaded conditions. Moreover, that adjustment also may be employed to enable the jaw to be "scooped" into or out of the end of the pipe section, as when an obstruction, such as a turn in the trench, limits the room available for moving the jaw within the pipe.

Preferably, a resilient pad 350 is mounted at the closed end of the jaw assembly by plates 352 adjustably mounted on both sides of jaw 338 by bolts 354 selectively securable in different ones of a series of holes formed through jaw 338. When beginning a new job of installing or moving a particular type and length of pipe section, the operator inserts jaw 338 into a first pipe section, until the end or bell 356 of the pipe engages pad 350. By trial and error in starting to lift the pipe section and, if necessary, adjusting the positioning of plates 352 horizontally on jaw 338, a balance is achieved so that jaw 338 and the pipe section hangs level as suspended from pivot 331. Adding flexibility in this regard, the assembly of motor 334 and shaft 330 preferably is affixed on the freeend portion of finger 336 by plates 356 secured to finger 336 by bolts 358 in selected ones of a similar series of holes distributed along the finger. This allows adjustment of the position of pivot 331 relative to the center of gravity of the overall finger and jaw assembly.

As mentioned, roller 348 is a pneumatic tire. Its purpose is to grip the wall of pipe section 339 with a degree of pressure sufficient only to hold the pipe in place on jaw 338 during movement. The amount of that pressure is held to a minimum, so as to avoid fracturing the pipe wall if brittle as in the case of such materials as concrete, cast iron and some plastics. To this end, roller 348 is only softly inflated, so that its portion engaged with the pipe wall compresses as clamping pressure is applied by operation of ram 342. Accordingly, the operator may limit the degree of clamping pressure in operation of ram 342 simply by visually observing the amount of "flatening" of the roller or tire against the pipe wall.

It is to be noted that any of the different grapples disclosed have utility when used with other than apparatus 30. Such a grapple may be suspended, for example, from the arm of a backhoe or by cable from the end of various types of cranes. In the latter case, it may be difficult to include a feature of controlled rotation about a vertical axis. Grapple 54", of FIGS. 20-22, is particularly suitable for use in moving concrete pipe within a storage yard or to and from a delivery vehicle.

In operation of the apparatus as depicted in FIG. 1, the operator seated on chair 58 manipulates the various control levers to drive the apparatus along a previously-established trench. Assuming that a section of pipe 32 already has been laid in trench 34, the operator then manipulates crane 44 and grapple 54 so as to pick up a new section 32 of the pipe either from alongside trench 34 or, particularly for pipes of smaller diameter, from a bunk 360 (FIG. 7) disposed on platform 130 above track 38. A second machine may be required only for the purpose of having previously disposed the pipe sections either in advance alongside trench 34 or in such a bunk disposed directly on the apparatus.

As shown in FIG. 7, platform 130 is supported fore and aft by tubular girder elements 362 and 364. Telescopingly slidable within those elements are rails 366 and 368. Upstanding from the outer ends of rails 366 and 368 are respective stanchions 370 and 372. Anchored on platform 130, between station 56 and bunk 360 thus defined, are spaced posts 374 and 376 joined across their upper ends by a rail 378. These latter elements are installed for protection of the operator seated on chair 58.

With this arrangement, pipe sections may easily be loaded into bunk 360 by use of a fork lift. The latter is employed to lift a group of pipe sections over the tops of stanchions 370 and 372 and then lower the sections onto rails 366 and 368 and the available portion of platform 130. The forks of the lift are then lowered further and withdrawn away from bunk 360.

It will have been observed that a number of the various components are driven by hydraulic motors. Preferably, at least most of those motors are identical, so that the inventory of spare parts desirably kept on hand may be reduced and simplified. Similarly, the various different rams should be standardized as much as possible.

Having full hydraulic control of both propulsion and steering, apparatus 30 may be equipped for automatic tracking of a trencher located just ahead or along a string line that has parallel relationship to the ditch. For example, a spring loaded telescoping finger may project forwardly from the center of carriage 36 for engagement at its outer end within a rearwardly facing box on a trencher. Telescoping of the finger would be coupled to a propulsion control lever, and lateral movement of the outer finger end by the box walls would be translated into operation of steering levers. Such a system would enable apparatus 30 to follow the trencher even around curves in the trench. The arrangement would allow the operator to devote his entire attention to the laying of the successive pipe sections.

For the weight of the pipe sections it can handle, apparatus 30 is comparatively light and compact. As mentioned, the version illustrated used an existing bulldozer for a foundation. That was specifically an International model number TD-14, a unit only of intermediate size. As a result, apparatus 30 weighs less than conventional trench digging apparatus which it is capable of pursuing without lag. Accordingly, the trench digger may be operated at its maximum capacity. This also illustrates the feasibility of joining apparatus 30 with a trench digger. Even though comparatively light in weight, the specific version of apparatus 30 described is capable of handling pipe sections that weigh up to six tons or more. Of course, it may be enlarged to handle even larger weights and/or sizes of pipe sections. On the other hand, it may desirably be reduced, so as to handle only lighter-weight pipe installation.

Various modes of operation are possible. If a section of pipe 32 previously has been laid in the trench as specifically illustrated in FIG. 1, the next section of pipe is picked up and crane 44 is then manipulated to deposit that next section in line in the trench ahead of the machine. On the other hand, the crane may be moved entirely to what would be the rear of the unit as viewed in FIG. 1 and caused to lay and manipulate the pipe in a direction away from the forward unit of the apparatus.

In either case, the operator is so situated as to be able at all times to observe grapple 54. Moreover, control station 56 is so located that he can watch the pipe section during the entire extent of its lowering within trench 34. When the apparatus is adapted for use with respect to extremely deep trenches, control station 56 desirably is moved more to the center of carriage 36 than illustrated, so as to insure complete operator control with vision at all stages of operation.

At today's state of the art, pipe sections 32 typically include sealing rings between sections, of neoprene or the like, that complete seals between successive sections upon mere insertion of one section into the next. Thus, at least when dealing with sizes of pipes typical for development of urban and semi-urban districts, the manipulation of crane 44 and of the overall apparatus is sufficiently flexible that the single operator located in chair 58 may not only pick up the next section of pipe and place it within the trench but also may control that next section of pipe as to insert its adjoining end into the previously laid pipe as he completes the placement of the following section. Accordingly, for many kinds of pipe installation, a single operator may perform the entire operation, both of pipe laying and successive joinder, without the need for anyone down in trench 34. That operation includes laying the pipe to grade, aligning successive sections and bedding the pipe in place.

Even when, for the reason of a necessity to perform additional operations, such as plastic wrapping of certain pipe materials in various kinds of corrosive soils that may involve locating personnel in the trench, the arrangement of apparatus 30 is such that movement of the pipe sections above persons that might be within the trench may be accomplished without ever suspending a pipe section under manipulation over those persons.

Various alternatives and additions are contemplated. For example, it would be a rather simple matter to construct carriage 36 of laterally telescopic elements, hydraulically or otherwise coupled, so as to permit carriage 36 to be of an adjustable length and thereby accommodate a variety of widths of trench 34. As mentioned above, a trench or other form of digging apparatus could be mounted to the front of carriage 36 so as to dig trench 34 in the first place as the machine progresses. Perhaps tied in with that modification would be the implementation of a throughput conveyor on carriage 36 that would carry dug materials from ahead of apparatus 30 back to its rear where those materials would again be deposited in trench 34 as backfill.

In approaching a new section of trench 34 that has not previously been provided with bedding material, the operator needs only to swing the outer end of conveyor 84 (or a rear conveyor 84a) over trench 34 and manipulate the various controls so as to cause material 72 to be delivered into the bottom of the trench to serve as a base for each pipe section as successively laid thereon. Typically, it then is desirable, after that section has been laid and coupled, to bed it further with more of the aggregate of material 72. To this end, the machine as illustrated may easily be reversed in direction of movement with respect to trench 34 and caused once again to deposit more of the aggregate or other bedding material.

Whatever the mode of operation, crane 44, in its different degrees of flexible and rotational movement, permits entire control of the orientation of each pipe section as the laying of that section occurs. In particular, pivot 64 permits adjustment of the vertical orientation of crane 44 regardless of the relative levels of the respective berms on either side of trench 34.

In some situations of soil condition, it is necessary in pipe laying to include the use of what is called a shoring box. That takes the form of a cage receivable within the trench and in which any workers that have to be located therein are protected against possible collapse of side walls of the trench. Should that further implement be necessary, it will be observed that grapple 54 may be used to grab a suitable lug provided on such a box or cage so as to move it along the trench as operation progresses.

In the alternative, a different control arm may be mounted on carriage 36 for the purpose of moving a shoring box which in itself well could have pins at each end to permit coupling from either its front or rear. The use of a ram coupling may be desired in order to facilitate the sliding of the box laterally in the trench for centering purposes. In any case, raising or lowering of one end of the box may be used for the purpose of dozing gravel to desired grade as the box is moved along the bottom of the trench.

While particular embodiments of the invention have been shown and described, and a variety of modifications and additions have been suggested, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. Apparatus for laying pipe in a trench and joining successive sections of said pipe as laid, comprising:

an elongated carriage of a length sufficient to straddle said trench;

propelling means mounted at each end portion of said carriage for engaging the surface outward from respective upper sides of said trench and moving said carriage along said trench;

means for driving said propelling means steerably along the length of said trench;

a crane arising from a central portion of said carriage and including an adjustably articulated arm of adjustable length and having an outer end portion controllably movable both laterally with respect to said trench and between respective positions effectively above the upper level of said trench and within said trench below the level of said carriage;

mounting means for securing said crane with respect to said carriage and permitting adjustable tilting of said crane relatively toward and away from the sidewalls of said trench;

and a controllable grapple mounted at said other end portion of said arm and engageable with said pipe.

2. Apparatus for laying pipe as defined in claim 1 which further includes means defining a control station mounted on said carriage in a position enabling an operator therein to observe movement of said grapple and joinder of said successive sections.

3. Apparatus for laying pipe as defined in claim 1 in which said grapple includes means for permitting swinging of said pipe about a vertical axis relative to said grapple.

4. Apparatus for laying pipe as defined in claim 2 in which said control station includes means for enabling said operator to adjust steering of said propelling means, adjust articulation of said arm, adjust length of said arm, adjust movement of said outer end of said arm both laterally and relative to said levels, and adjust said tilting.

5. Apparatus for laying pipe as defined in claim 1 which includes a pivot bearing mounted in the central portion of said carriage and having a first part secured to said carriage and a second part secured to said crane to permit said tilting.

6. Apparatus for laying pipe as defined in claim 5 in which one of said parts further includes means for enabling swinging of said crane in a direction laterally of said trench.

7. Apparatus for laying pipe as defined in claim 1 which further includes:

a hopper mounted upon said carriage for carrying material to be dispensed into said trench;

a gate disposed in the bottom of said hopper and adjustable to control dispensing of said material;

and means for delivering said material from said hopper into said trench.

8. Apparatus for laying pipe as defined in claim 7 in which said delivering means includes a conveyor swingably mounted from said carriage between a delivery position over said trench and another position displaced to one side of said trench.

9. Apparatus for laying pipe as defined in claim 8 which includes means for adjusting the relative level of the delivery end of said conveyor.

10. Apparatus for laying pipe as defined in claim 8 which further includes means for adjusting the rate of delivery of said material from said hopper by way of said conveyor into said trench.

11. Apparatus for laying pipe as defined in claim 7 in which said driving means is a motive source that exhausts a heated gas and which further includes means for conducting said heated gas through said material in said hopper and transmitting heat therefrom into said material.

12. Apparatus for laying pipe as defined in claim 11 in which said conducting means includes a pipe in which are disposed a plurality of outlets for emitting a portion of said heated gas into said hopper.

13. Apparatus for laying pipe as defined in claim 1 which includes an adjustable element outrigged adjacent to and in line with said propelling means.

14. Apparatus for laying pipe as defined in claim 13 in which said element is a dozing blade.

15. Apparatus for laying pipe as defined in claim 1 in which said propelling means includes a brake-operating lever and a clutch-operating lever and which further includes means for moving said clutch-operating lever in a disengaging direction prior to movement of said brake-operating lever in an actuating direction automatically upon operator command of steering movement.

16. Apparatus for laying pipe as defined in claim 1 in which said grapple includes:

a vertical shaft;

a coupling to mount the upper end portion of said shaft on said outer end portion of said arm for rotation about a vertical axis;

means for adjustably rotating said shaft about said axis;

means for pivotally coupling said shaft to said coupling to permit suspension of said shaft vertically;

a first pipe-clamping jaw rigidly depending from the lower end portion of said shaft;

a second jaw, movable toward said first jaw in mutual pipe-clamping relationship, pivotally mounted with respect to said first jaw;

and actuating means for opening and closing said second jaw relative to said first jaw.

17. Apparatus for laying pipe as defined in claim 16 in which said actuating means is pivotally coupled to said shaft.

18. Apparatus for laying pipe as defined in claim 17 in which said jaws include removable segments having facing contours shaped to a particular size of pipe to be clamped.

19. Apparatus for laying pipe as defined in claim 1 in which said grapple includes:

a vertical shaft;

a coupling to mount the upper end portion of said shaft on said outer end portion of said arm for rotation about a vertical axis;

means for adjustably rotating said shaft about said axis;

means for pivotally coupling said shaft to said coupling to permit suspension of said shaft vertically;

an abutment rigidly affixed on the lower end of said shaft and engageable with a section of said pipe;

a flexible sling of a length sufficient to encircle said section;

adjusting means flexibly secured between one end of said sling and one side of said shaft;

and means for securing the other end of said sling to the side of said shaft opposite said one side.

20. Apparatus for laying pipe as defined in claim 19 in which said abutment presents a downwardly facing generally concave surface of a contour approximating that of said section.

21. Apparatus for laying pipe as defined in claim 19 in which said abutment presents a downwardly facing surface having a succession of facets together composing a series of chords of a circle.

22. Apparatus for laying pipe as defined in claim 1 in which said grapple includes:

a vertical shaft;

a coupling to pivotally mount the upper end portion of said shaft on said outer end portion of said arm to permit suspension of said shaft vertically;

a finger coupled at one end portion to the lower end of said shaft and projecting laterally therefrom;

a jaw pivotally coupled at one end to the other end of said finger and swingable to a location spaced beneath said finger to hold the wall of a section of said pipe therebetween;

and adjustably powered means for swinging said jaw relative to said finger.

23. Apparatus for laying pipe as defined in claim 22 in which said adjustable powered means is a hydraulic ram pivotally coupled between said jaw and said finger.

24. Apparatus for laying pipe as defined in claim 22 which includes means for adjusting the effective length of said jaw.

25. Apparatus for laying pipe as defined in claim 22 which includes means for adjusting the location of coupling between said one end portion of said finger and said lower end of said shaft.

26. Apparatus for laying pipe as defined in claim 22 which includes means projecting from said finger toward said jaw for engaging the exterior of said wall.

27. Apparatus for laying pipe as defined in claim 26 in which said projecting means includes a roller.

28. Apparatus for laying pipe as defined in claim 27 in which said roller is a pneumatic tire.

29. Pipe handling apparatus comprising:

an elongated and laterally projecting finger having opposed ends and of a shape enabling its disposition longitudinally along the outside of a length of pipe of predetermined length;

coupling means for pivotally suspending one end portion of said finger;

an elongated jaw which defines a flat upwardly facing surface engageable with the interior wall of said pipe as said pipe is resting on said surface and having a length enabling its insertion distance inside said length of pipe at least approximately half of said predetermined length, pivotally coupled at one end to the other end of said finger and swingable to a location spaced beneath said finger to hold a sector of the wall of a section of said pipe between said jaw and said finger when said jaw is inserted within said pipe;

and adjustably powered means for swinging said jaw toward and away from said finger.

30. Pipe handling apparatus as defined in claim 29 in which said adjustable powered means is a hydraulic ram pivotally coupled between said jaw and said finger.

31. Pipe handling apparatus as defined in claim 29 which includes means for adjusting the effective length of said jaw.

32. Pipe handling apparatus as defined in claim 29 which includes means for adjusting the location of said coupling means on said one end portion.

33. Pipe handling apparatus as defined in claim 29 which includes means projecting from said finger toward said jaw for engaging the exterior of said wall.

34. Pipe handling apparatus as defined in claim 33 in which said projecting means includes a roller.

35. Pipe handling apparatus as defined in claim 34 in which said roller is a pneumatic tire.

* * * * *